United States Patent [19]
Davis

[11] 3,780,926
[45] Dec. 25, 1973

[54] ULTRASONIC RIGID HORN ASSEMBLY
[75] Inventor: Paul H. Davis, St. Charles, Ill.
[73] Assignee: Dukane Corp., St. Charles, Ill.
[22] Filed: June 2, 1972
[21] Appl. No.: 259,023

[52] U.S. Cl.................. 228/1, 29/470.1, 156/73
[51] Int. Cl............................................. B23k 5/20
[58] Field of Search.................... 228/1; 29/470.3,
29/470.1; 156/73; 310/26

[56] References Cited
UNITED STATES PATENTS

| | | | |
|---|---|---|---|
| 3,148,293 | 9/1964 | Jones et al. | 310/26 |
| 3,166,840 | 1/1965 | Bancroft et al. | 29/470 |
| 3,209,448 | 10/1965 | Jones | 29/470.1 |
| 3,210,724 | 10/1965 | Jones et al. | 310/26 X |
| 3,440,117 | 4/1969 | Saloff et al. | 29/470.3 X |
| 3,612,385 | 10/1971 | Humpage | 228/1 |

Primary Examiner—J. Spencer Overholser
Assistant Examiner—Robert J. Craig
Attorney—Robert L. Kahn

[57] ABSTRACT

A versatile rigid horn assembly for distributing ultrasonic energy from at least one source to a plurality of spaced work areas is provided. This rigid horn assembly includes an elongated tool holder having an input region at one end and an output region at the other end. The tool holder is a horn of suitable metal and will have a length of at least one acoustical half wavelength, or any desired number of integral half wavelengths. Secured to and extending from the output end are rigid tool members, each of which is a horn and has a length of at least one acoustical half wavelength. Tool members may have lengths of integral half wavelengths, it being understood that tool members need not necessarily be of the same shape or length. The drawings illustrate various arrangements of tool members. The output end of a tool holder has means permitting attachment of a plurality of tool members, the means being arranged so that one or more various tool members may be disposed to provide different tool member patterns. The means for attaching a tool member to a tool holder includes threaded metal members each of which may be a threaded stud extending into a tapped recess in the tool holder or elongated bolts each having an enlarged head disposed in bores extending longitudinally of the tool holder and having an interiorly shouldered part for each bore.

Alternatively, a tool member may include an integral threaded boss, or the tool holder and tools may be of brazable material and secured by brazing.

5 Claims, 16 Drawing Figures

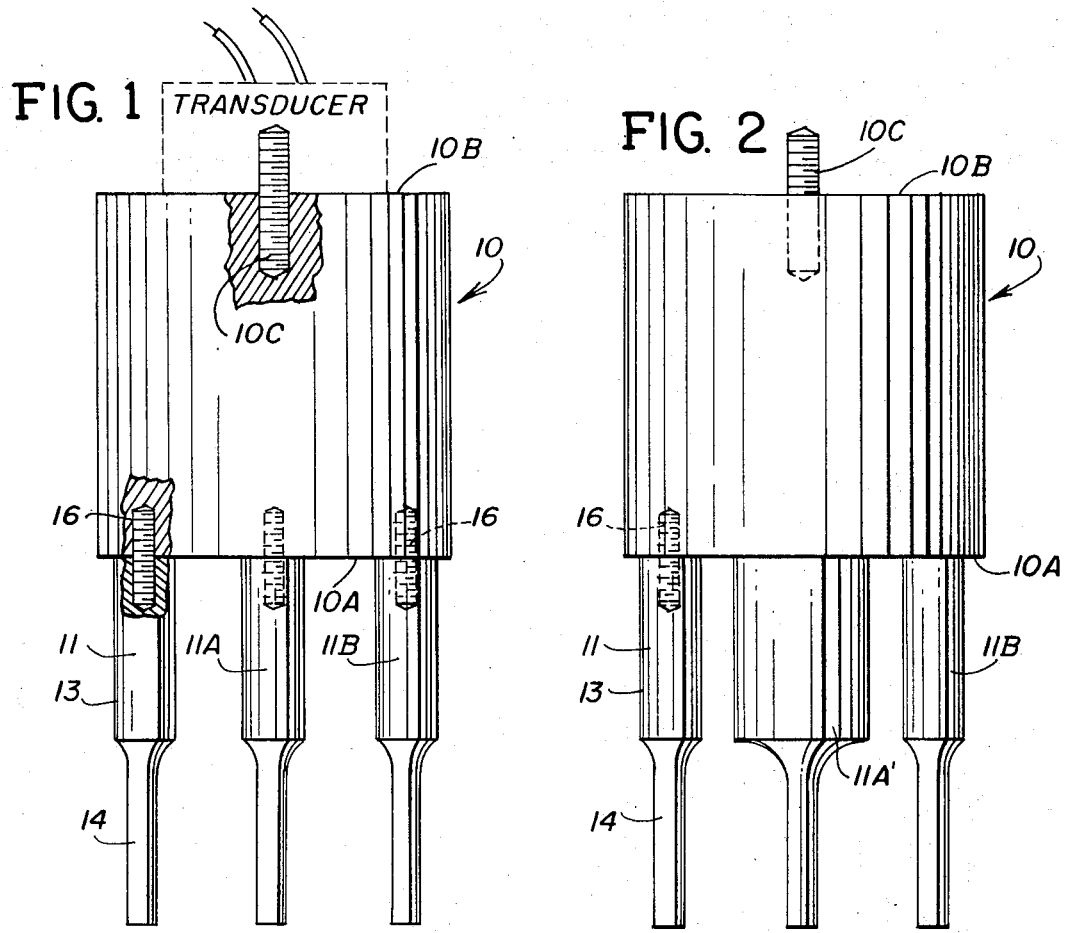
FIG. 1
FIG. 2
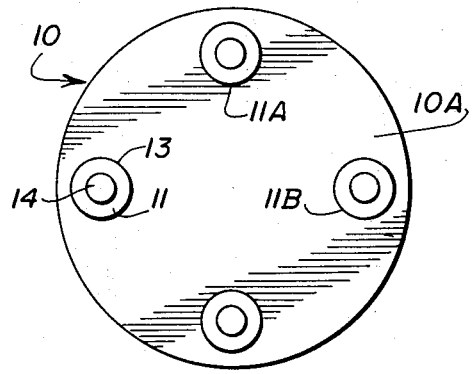
FIG. 1A
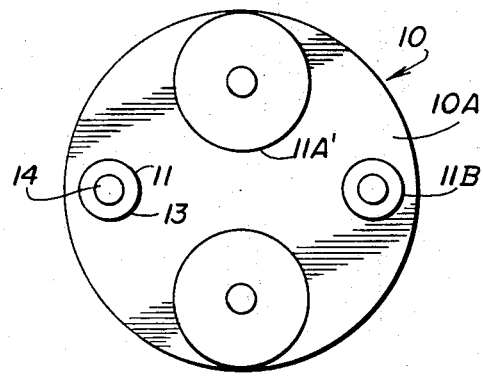
FIG. 2A

ULTRASONIC RIGID HORN ASSEMBLY

INTRODUCTION

This invention relates to an ultrasonic rigid horn assembly having enhanced functional adaptability for distributing ultrasonic energy from one or more sources to a plurality of tool members for application to various work areas. The invention particularly relates to applications of ultrasonics to plastics, such as welding, staking or inserting. As an example, welding may be accomplished by application of ultrasnoic energy at predetermined work areas. In many instances, such work areas are disposed at spaced intervals in desired patterns for simultaneous treatment. The ultrasonic energy is directed to such spaced work areas to create simultaneously a pattern of weldments or other work.

It is not limited to plastics working, however, and may be useful where ultrasonic energy is required at discrete locations. Thus liquid at a number of locations may be cavitated.

It has been the practice to provide a unitary tool structure whose input is connected to a suitable source of ultrasonic acoustic energy and whose output is available at spaced sonic applicator regions on the tool. The sonic regions may assume a variety of forms, such as small separate circular or rectangular areas, all adapted to operate on the work piece and provide the desired effect at each of the sonic applicator regions. Inasmuch as the sonic applicator regions must be supplied with ultrasonic energy, the sonic wave transmission characteristics of a tool structure is determined in a substantial manner not only by the nature of the tool structure material (usually metal) but also by the longitudinal and transverse dimensions of the tool structure material. Such requirements involve shaping of a tool structure to obtain the required sonic tuning and vibration amplitude. It is, of course, well understood in this art that unless sonic energy is fed to every one of the spaced sonic energy applicator areas, that the desired action at the various regions to be operated upon may not occur.

As a rule, customer requirements with regard to number and spacing of sonic applicator regions in a tool structure differ greatly and may change even with changes only in dimensions and number and pattern of work areas.

In tool making for various customer requirements, the shaping of a tool to obtain desired operation often involves difficult machining operations to provide the desired shapes of the various parts of a tool. Frequently, such tools can not utilize surfaces of revolution in their manufacture. Consequently, the shaping of a tool may require difficult milling operations or even hand work. The various portions of a tool structure from the sonic input part to the respective individual sonic outputs must all have precise tuning and vibration amplitude characteristics.

The machining requirements for such tools are often made more expensive by the fact that the tool metals used in ultrasonic work may be special alloys, difficult to machine, such as titanium or monel. Titanium, in particular, is very expensive as a raw material. In some instances, special thicknesses of metal plates for tool fabrication are required.

The resulting tool is useful for one particular job and rarely is adaptable for a different pattern of work areas. Consequently, any change in a work area pattern by customer's needs usually involves a complete change in tooling. Furthermore, tool metals may not have long life under conditions of rapid wear at working surfaces so that in many instances total tool renewal becomes necessary.

GENERAL REQUIREMENTS FOR TOOL STRUCTURE

The structure which couples ultrasonic energy from the acoustic source (piezoelectric or magnetostrictive transducer) to the material to be processed must satisfy several requirements:

1. Provide a sufficiently large output area to encompass the workpiece locations to be treated.
2. Provide whatever contours are necessary to provide concentration of sonic energy so that the required vibration amplitude will be available at the work locations.
3. The material must have sufficiently high strength to withstand high stresses present along the contoured sections.
4. The material must have sufficiently good wear resistance to withstand abrasion at the work faces.

According to prior art, structures are fabricated from one piece of metal and at least the first three of the above requirements must be met by this material. Unless the work areas can be provided with wear-resistant inserts, all four requirements must be met. In cases where a large work area must be handled, and high amplitude is required, this means that the structure (or horn) must be made of titanium or monel, materials which are both expensive as raw materials and difficult to machine.

In some cases, it may be very difficult or impossible to provide the contours necessary to produce the vibration amplitude required at the work areas.

In the present invention, the requirements to be satisfied are divided between a tool holder horn and one or more rigid tool member horns which taken together make up a rigid horn assembly.

The new tool holder provides for locating the tool members at the necessary points across the area. It has relatively low stress situations, no location of wear, and may be made of cheap, easily machineable materials such as aluminum. It does not require elaborate contours to be generated.

The new tool members deliver the ultrasonic energy to the material being processed, and include whatever contours are required to produce the vibration amplitude necessary to do the work. Contours may be as elaborate as needed to give the required amplitude, high stress points may be present, and high wear conditions may be present at the work face. Special materials such as titanium 6AL–4V may be required, and these metals are both expensive and difficult to machine. The size of these tool members can be held to a minimum, proportionate to the input and output areas required to couple the energy, thus material costs and machining time are held down.

In practically all cases, at least part of the new tool member can be round in section so that full use may be made of contouring techniques to provide amplitude magnification.

ADVANTAGE OF THE INVENTION

The present invention to be hereinafter described makes possible an ultrasonic rigid horn assembly having enhanced functional adaptability, whose pattern of sonic applicator work areas may usually be modified without requiring a completely new structure. For one thing, a great advantage of a rigid horn assembly embodying the present invention resides in the fact that the tool holder may be a body having flat or cylindrical outer surfaces and is susceptible to accurate economical machining. The sonic transmission characteristics of such new tool holder portion may be controlled accurately and will remain unchanged throughout the various tool transformations which the invention permits.

The new tool holder must be longitudinally resonant to a desired operating frequency range and has its output end portion or has its entire body portion shaped or constructed in such a manner as to accommodate a desired number of or pattern of rigid tool members. These tool members similarly must be longitudinally resonant and if more than one are used, are respectively adapted to receive sonic energy from the tool holder and apply it to work areas. The number and pattern of tool member positioning may be changed easily without disturbing the tool holder design whose shape and dimensions are adapted to provide different patterns of work areas.

Each tool member is rigid and is individually attached to the tool holder to project from the output end thereof. The attaching means is adapted to be detachable and will include a threaded stud or bolt of suitably strong material, usually specially strong steel.

The attaching means itself may include tapped recesses or holes extending into the output end of the tool holder and/or longitudinal bores or holes extending parallel to the axis of the tool holder but laterally offset therefrom, such bores preferably each having an internal shoulder against which the enlarged head of a steel bolt may be seated. The tapped recesses or holes and/or longitudinally disposed bores or holes may be disposed in any desired pattern so that any one or more tool members may be used in different patterns and spacing arrangements. In all cases, it is preferred to limit the number, spacing and depth of tapped recesses and/or longitudinal bores to minimize substantial changes in the sonic transmission characteristics such as resonance and internal reflections of the tool holder between the input and output thereof. It will generally be desirable to have the tool holder output area sufficiently great to accommodate a number of tool positions in a desired pattern. In all cases, however, the transverse tool holder dimensions must be chosen and proportioned with respect to the overall length to produce the desired longitudinal mode of acoustical resonance, with undesired modes minimized so that the tool members can produce the desired action on the work areas.

Another substantial advantage obtainable with the invention is the possibility of having tool members so inclined that their longitudinal axes are non-parallel to the tool holder axis by a small angle thus providing a working field which may be somewhat larger or somewhat smaller than the working field obtainable when the tool member and tool holder axes are parallel.

Other advantages will become apparent later with a more detailed description of the invention.

BRIEF DESCRIPTION OF DRAWINGS

The invention will be described in connection with the drawings wherein FIG. 1 is an elevation of a rigid horn assembly embodying the present invention.

FIG. 1A is a bottom view showing the rigid horn assembly of FIG. 1 to illustrate a pattern of tool members.

FIG. 2 is an elevation of a modified form of rigid horn assembly wherein certain tool members are dimensioned differently to provide different vibration amplitudes.

FIG. 2A is a bottom view of the rigid horn assembly illustrated in FIG. 2 showing the arrangement of tool members.

DETAILED DESCRIPTION OF THE INVENTION

Figure 3:
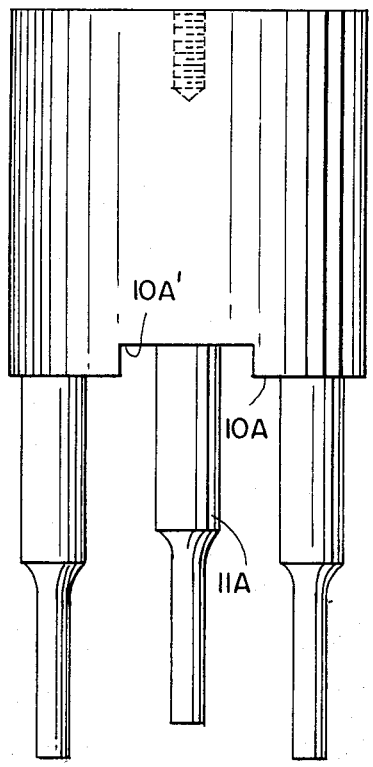
FIG. 3 is an elevation of a still further modified form of the invention illustrating an arrangement of tool member tips at different levels.

The new rigid horn assembly embodying the present invention consists essentially of tool holder 10 and one or more tool members 11, 11A, 11B, etc. Tool holder 10 is preferably of metal having appropriate accoustical and strength properties and may, for example, be of certain grades of aluminum, titanium, or the like. As examples, an aluminum alloy 7075–T651 can be used. In case of titanium, an alloy known as 6Al–4V may be used.

Tool holder 10 has its length equal to an integral number of half wavelengths at the operating frequency to be used. As a rule, a single half wavelength may be used. For a five inch diameter tool holder of aluminum 7075–T651 for example, and using 20KHz, a length of 4.345 inches may be used. This length is an actual example and it is understood that different lots of material may vary in acoustic properties, so the length may depart slightly from the value given. One common shape for tool holder 10 is cylindrical, although, a rectangular or polygonal shape may be used.

It is understood that the requirement for substantial area at output end 10A of tool holder 10 is dictated by the desirability of having tool members in desired number and spacing carried at such end. Tool holder 10 is preferably proportioned so as to avoid change in vibration amplitude from the input end 10B of tool holder 10 to the output end 10A. End 10B of tool holder 10 is adapted to be coupled to one or more sources of sonic energy. This is most simply accomplished by having tapped recess 10C for each source extending into the tool holder and preferably symmetrically disposed with respect to the tool holder axis. In order to attach a source of sonic energy, a steel stud may be screwed into recess 10C, the steel stud being strong enough to withstand the various stresses and strains to which it may be subjected. For example, a sonic generator of the piezoelectric or magnetostrictive type may be used, the output being directly coupled to tool holder 10 or through an intermediate resonant coupling member.

One or more tool members 11; 11A; 11B etc. may be coupled to tool holder 10 at output face 10A. Referring to tool member 11, as an example, this consists of input portion 13 and reduced tool member portion 14 as an extension thereof. In the particular example given, tool member 11 as a whole will have an overall length of one-half wavelength with input portion 13 and tool member portion 14 being respectively one-quarter wavelength each. It is understood that the physical length of the entire tool member may be different from the physical length of tool holder 10 depending, of course, upon the nature and contour of the material used.

The designation of one-half wavelength for the overall tool member 11 is exemplary. It is understood that either the tool holder or the tool member, or both, may have one or more integral number of acoustical half wavelengths. In particular, the possibility of using tool members longer than one-half wavelength may be desirable. There is no particular arrangement or number of tool members necessary for use at the output part 10A of the tool holder.

Referring to FIG. 1A, it will be observed that a symmetrical arrangement of four tool members is provided. Each tool member is rigidly secured to tool holder 10 by means of threaded steel stud 16. It is important that stud 16 be of a sufficiently strong material and properly dimensioned to withstand the vibratory stresses. Stud 16 may be integral with a tool member, if the tool is of sufficiently strong metal, such as titanium. The stud will in all cases extend into tapped recesses or holes in bottom face 10A of tool holder 10.

While four tool members are shown, it is not necessary that all tool members be used or be positioned in the tool holder. In fact, there is nothing magic about the number of tool members and the number may be as desired. This is also true of the pattern in which the tool member accommodating recesses are disposed. While the number and spacing of tool member accommodating recesses in face 10A of tool holder 10 may vary within wide limits, it is essential that the volume of metal removed from all the recesses be small enough in comparison to the mass of the entire tool holder so that the general transmission characteristics of tool holder 10 for conducting sonic energy from face 10B to face 10A be unimpaired. Thus, if an excessively large number of tapped recesses is to be provided, it may be necessary to compensate a change in transmission characteristics by adjusting the length of the tool holder or the transverse dimensions of the tool holder or both.

No attempt is made to show the detailed structure of tool member portion 14 at the tip thereof since such details are well known, depending upon the work effect to be created. It should be noted that the various tool members extending downwardly from tool holder 10 are rigid members and that the entire assembly of tool holder and tool members together with the source of sonic energy, such as transducer, may be handled in conventional fashion by supporting in a press so that one or more tool members have their working ends pressed against the work piece to be treated. The actual support of the entire assembly of transducer, tool holder 10 and the tool members, may be on the transducer, or on tool holder 10 or both. If the tool holder is to be supported, then a supporting nodal mount around the middle of tool holder 10 can be provided. At this region of the tool holder, the longitudinal amplitude of the sonic energy is substantially zero. The same is true for transducers so that mounts for the nodal regions of transducers and tool holders may be joined.

Referring now to FIG. 2, the tool member is substantially similar to that illustrated in FIG. 1 except that tools 11A' are shown as being of greater transverse area than 11 and 11B. Such an arrangement permits greater amplitude to be delivered at the working end of the tool member as may be required in certain instances.

Figure 3A:
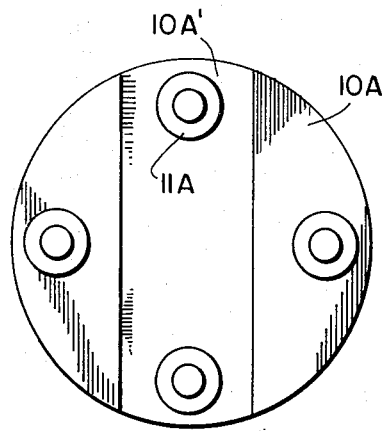
FIG. 3A is a bottom view of the rigid horn assembly illustrated in FIG. 3.

Referring now to FIG. 3, output face 10A has slotted portion 10A' for accommodating tool members 11A so long as the offset of slotted portion 10A with respect to 10A is small in terms of wavelength (as for example in the assumed case a difference of about one-quarter of an inch may be tolerated), the rigid horn assembly will function generally satisfactorily. Such an arrangement may be desirable where material to be worked upon requires a stepped arrangement of tool member working faces. As is illustrated in FIG. 3A, slotted portion 10A' extends straight across the end face of tool holder 10. It is not necessary that slot 10A' extend all the way across and instead only one of the face members 11A may be thus longitudinally offset.

Figure 4:
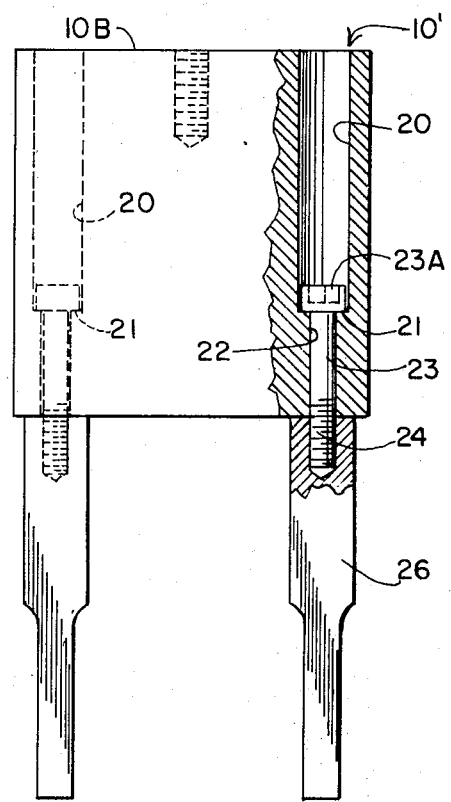
FIG. 4 is an elevation of a still further modified form of rigid horn assembly, this showing different means for attaching tool members to the tool holder.

Referring now to FIG. 4, a different arrangement of tool member attachment to tool holder 10' is illustrated. In this instance, instead of tapped recesses in the tool holder, there may be a pattern of passages or holes longitudinally of the tool holder and generally parallel to the axis but laterally offset therefrom. Such passages have enlarged bore portions 20 having shoulders 21 and reduced bore portions 22 extending longitudinally of tool holder 10'. Bolts 23 having enlarged heads 23A can extend as illustrated with threaded portions 24 extending into and cooperating with threaded recesses in tool member 26. Tool member 26 may have a suitable workable shape. As shown here, enlarged head 23A of bolt 23 is provided with a suitably shaped hex recess for engagement by a hex shaped rod to be used as a wrench. The diameters of bores 20 and 22 and shoulder 21 are all relatively proportioned so that each tool member retaining bolt will not be excessively stressed. Again as with tapped recesses or holes in the tool holder previously described, it is essential that the number of passages or holes 20 and 22 in a tool holder be such that the transmission characteristics of the entire tool holder remain constant. In this particular modification, it is clear that the volume of metal removed for each tool member position is much greater than in the previous instances where only a blind tapped recess is used. However, the compensation for the removal of metal may be readily provided by controlling the lateral and longitudinal dimensions of the tool holder. The arrangement of bolts as illustrated here in FIG. 4 is such that access to the top face 10B of tool holder 10' is required. In some instances, the mounting of the rigid horn assembly, transducer accessories various accefories may make access difficult. It is understood, therefrom, that while the two arrangements illustrated in FIG. 4 and FIGS. 1 to 3 for example with regard to tool member attachment to a tool holder are equivalent, one may for certain purposes be more convenient than the other.

Figure 4A:
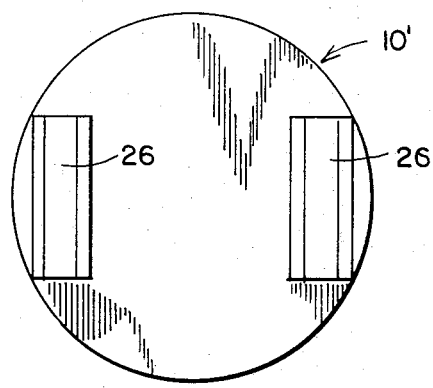
FIG. 4A is a bottom view of the tool member arrangement illustrated in FIG. 4.

Referring to FIG. 4A, it will be noted that tool member 26 has the top portion of rectangular shape. Either one or two bolts 23 may be used for each tool member, depending upon requirements for a particular job. The arrangement of tool members in this particular tool holder may vary so that more or less than two tool members are used.

Figure 5:
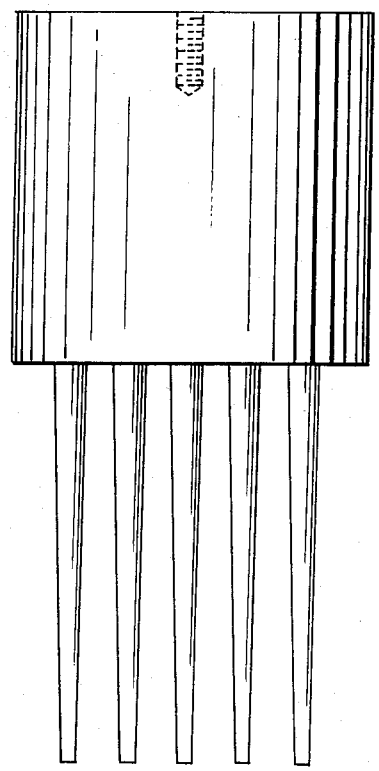
FIG. 5 is an elevation of a still further modified form of a rigid horn assembly embodying the present invention, this illustrating linear arrangement of tool members.
Figure 5A:
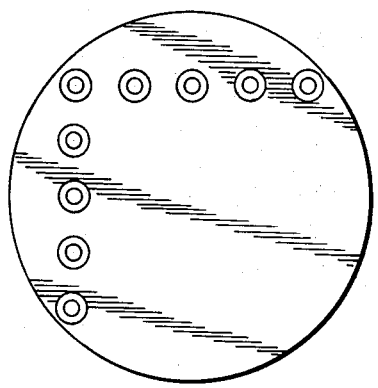
FIG. 5A is a bottom view of the tool member arrangement of the structure illustrated in FIG. 5.

Referring to FIG. 5, a modified tool member arrangement, each of which may have a tapered shape, is illustrated. In this particular modification, as illustrated in FIG. 5A, two lines of tool members at right angles to each other are illustrated. It is not necessary that every tool member position be filled with a tool member and it is not even necessary that each tool member be of the tapered type.

Figure 6:
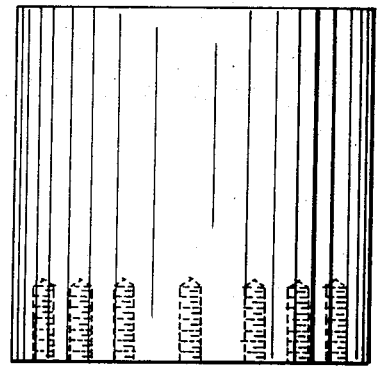
FIG. 6 is an elevation of a tool holder embodying the present invention showing a pattern of recesses for tool member attachment.
Figure 6A:
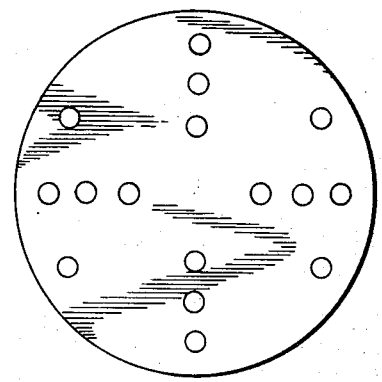
FIG. 6A is a bottom view showing the arrangement of recesses.

Referring now to FIG. 6, an arrangement of recesses in a tool holder is shown wherein such recesses which are tapped are aligned along lines which extend in various directions making possible a large number of possible tool member arrangements. It is understood that this particular arrangement of recesses or holes may be replaced by through passages or holes in a tool holder similar to FIG. 4.

Figure 7:
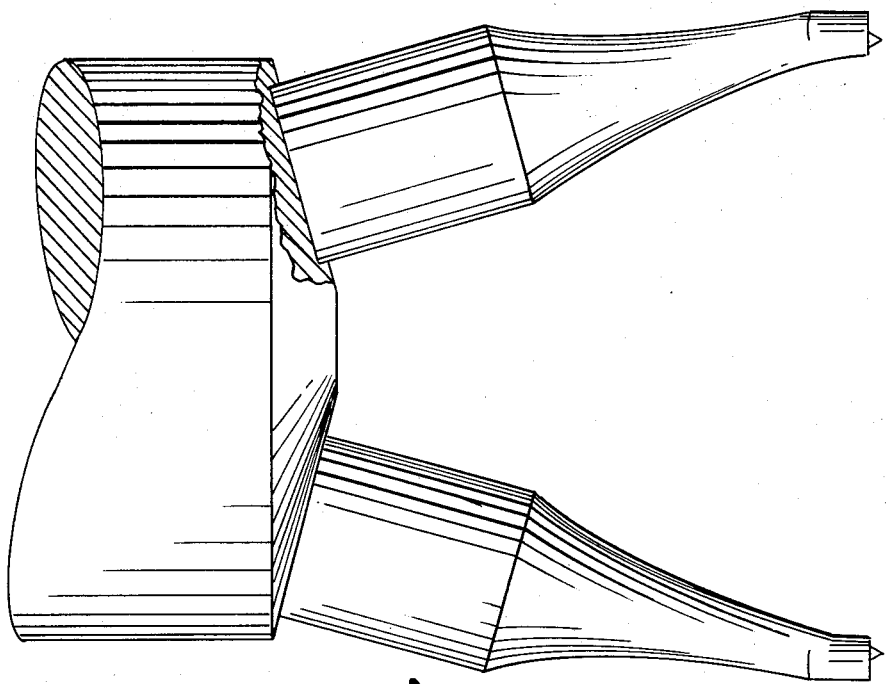
FIG. 7 is an elevation of a still further modified form of rigid horn assembly embodying the present invention, this illustrating tool members diverging at a slight angle to the tool holder axis rather than being parallel.

Referring now to FIG. 7, a tool holder is illustrated wherein tool members have their axes disposed at a slight angle to the tool holder axis. Thus, two or more tool members may be arranged in this fashion, it being understood that the various angles at the output faces of the tool holder must be small.

By having the tool member axes inclined to be non-parallel to the tool holder axis, the totality of all work area patterns may be made smaller or larger than the entire work area of parallel tool member arrangements.

Figure 7A:
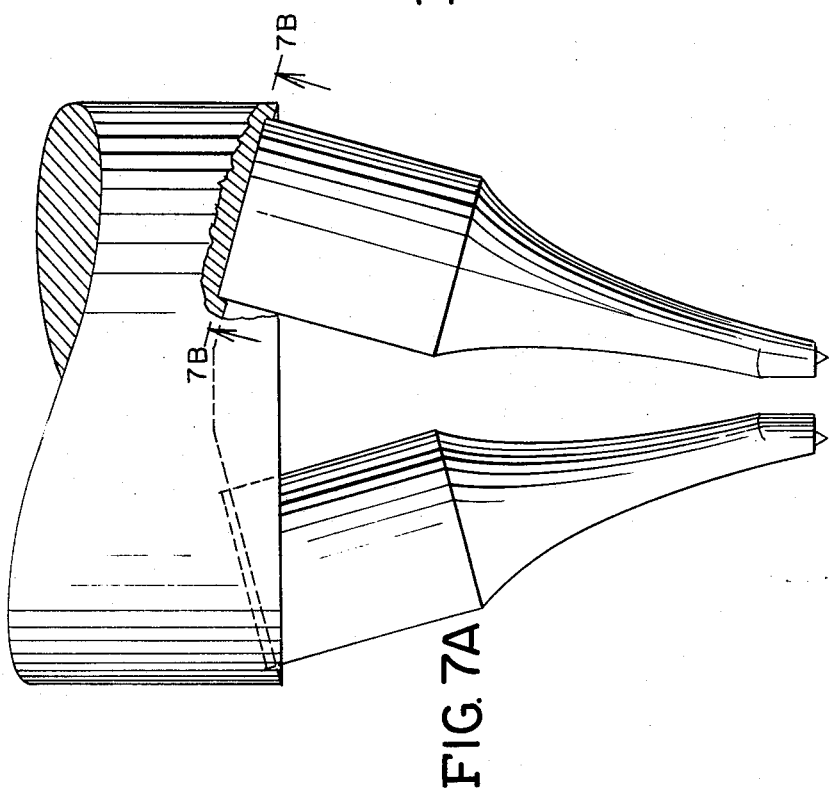
FIG. 7A shows a modification of the form of the invention illustrated in FIG. 7.
Figure 7B:
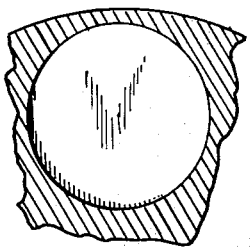
FIG. 7B is a detail of FIG. 7A on line 7B—7B.

In FIG. 7, the rigid horn tool members diverge. In FIG. 7A, the tool members converge. In both cases, the opposing tool holder and tool member surfaces must be flat and true. Where the entire tool holder face is conical, it is necessary to machine flat areas against which a tool member may fit, as suggested in FIG. 7B. The tool members may be bolted, brazed or welded in place.

Figure 8:
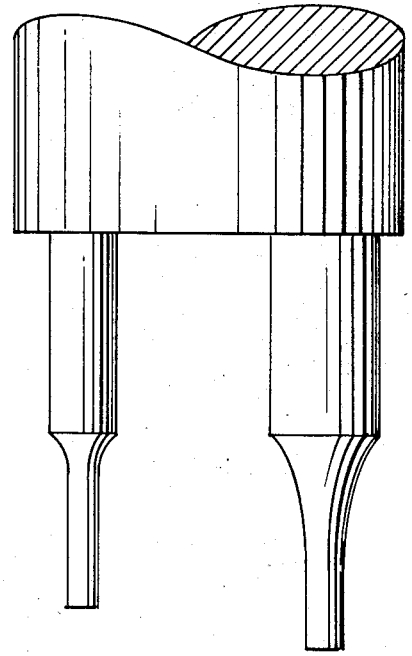
FIG. 8 is a still further modified form of a rigid horn assembly embodying the present invention showing two tool members having different lengths, the two tool members having different contours to maintain equality of dimensions in acoustical half wavelengths.

In FIG. 7A, the convergence of the tool member tips may require machining after tool members have been set in place on a tool holder. This may involve shaping the tool member tips to straighten out the working axis normal to the work Referring now to FIG. 8, an arrangement is shown wherein two differently dimensioned tool members are utilized, one tool member being thicker and longer than the other. This arrangement can be obtained by controlling the nature of the contour for the tool. It is understood, of course, that in each case each tool must have a length equal to one or more integral half wavelengths.

In a broad sense, a tool holder and tool member may each be considered as a horn so that an entire assembly may be designated as a rigid horn assembly.

An entire assembly of tool holder and tool member horns embodying the present invention is substantially rigid at the tool member ends even though resilient nodal mounting means for tool holder and/or transducer means are provided. Resilient mounts are desirable because of their efficiency.

What is claimed is:

1. An ultra-sonic tool system for industrial processing with acoustic energy, said system comprising an elongated, straight, rigid, unitary tool holder of rigid material having a longitudinal axis and a length of an integral number of half-wave lengths at the operating frequency, the transverse dimensions being so proportioned to the length thereof as to minimize undesired modes of transmission other than along the tool holder length, said tool holder having only two ends shaped to provide finished flat sonic energy input and output areas, the tool holder providing a common transmission path for all sonic energy from the input to the output thereof, threaded means at the input end for coupling at least one source of sonic energy thereto; at least two, elongated, rigid tool members laterally spaced from each other rigidly secured directly to a sonic output area of the tool holder, each tool member having at one end a sonic input area conforming to a sonic tool holder output area in the secured positions of the tool holder and tool members, each tool member having a sonic energy working output tip at its other end, the tool holder output area being great enough to accommodate a plurality of laterally offset, secured tool members arranged to create a desired pattern of work areas, each tool member having a length of an integral number of half-wave lengths; whereby said tool holder material may be selected on a basis of acoustic properties, cost, and ease of machining and the tool member material may be selected on a basis of acoustic properties and toughness for working life, said tool holder and tool members being each resonant to the acoustic energy so that efficient transmissions of sonic energy to the work areas result, each tool member being susceptible to individual design with regard to tool member contours, amplitude of sonic energy at a work area and physical length of a tool member; the machining problem of the tool holder being distinct from any problem of machining a tool member, said tool system being sufficiently rigid so that it may be pressed against work without accessories for guiding tool members.

2. The construction according to claim 1 wherein said tool holder has a plurality of holes extending from at least one output area thereof inwardly toward the input end thereof and wherein threaded means are provided for rigidly securing a tool member to said holder at a desired hole.

3. The construction according to claim 2, wherein threaded metal studs for rigidly securing said tool members to the output of said tool holder are provided.

4. The construction according to claim 2, wherein said tool holder has a plurality of longitudinal bores extending parallel to and laterally offset from the axis of the tool holder, and a bolt for rigidly securing a tool member to the tool holder at a bore.

5. The construction according to claim 1, wherein the tool holder is shaped so that the transverse dimensions remain substantially constant along the length of such holder.

* * * * *